US012756132B2

(12) United States Patent
Wu et al.

(10) Patent No.: US 12,756,132 B2
(45) Date of Patent: Oct. 6, 2026

(54) HARNESS CONNECTOR

(71) Applicant: Amphenol Technology (Zhuhai) Co., Ltd., Zhuhai City (CN)

(72) Inventors: Ian Wu, Zhuhai City (CN); Rob Weng, Zhuhai City (CN); Rosan Huang, Zhuhai City (CN)

(73) Assignee: Amphenol Technology (Zhuhai) Co., Ltd., Zhuhai City (CN)

( * ) Notice: Subject to any disclaimer, the term of this patent is extended or adjusted under 35 U.S.C. 154(b) by 406 days.

(21) Appl. No.: 18/540,719

(22) Filed: Dec. 14, 2023

(65) Prior Publication Data

US 2025/0023284 A1 Jan. 16, 2025

(30) Foreign Application Priority Data

Jul. 10, 2023 (CN) ......................... 202321807644.2

(51) Int. Cl.

*H01R 13/502* (2006.01)
*H01R 4/02* (2006.01)
*H01R 11/28* (2006.01)
*H01R 13/42* (2006.01)

(52) U.S. Cl.

CPC ........... *H01R 13/502* (2013.01); *H01R 4/023* (2013.01); *H01R 4/029* (2013.01); *H01R 11/28* (2013.01); *H01R 13/42* (2013.01)

(58) Field of Classification Search

None

See application file for complete search history.

(56) References Cited

U.S. PATENT DOCUMENTS

| | | | | |
|---|---|---|---|---|
| 6,575,772 | B1 * | 6/2003 | Soubh | H01R 12/598 439/700 |
| 10,424,878 | B2 * | 9/2019 | Lloyd | H01R 12/716 |
| 10,535,956 | B2 * | 1/2020 | Henry | H01R 12/62 |
| 2023/0198204 | A1 * | 6/2023 | Hung | H01R 13/516 439/352 |
| 2025/0087917 | A1 * | 3/2025 | Kato | H01R 12/79 |
| 2025/0253562 | A1 * | 8/2025 | Ho | H01R 11/28 |

* cited by examiner

*Primary Examiner* — Oscar C Jimenez
(74) *Attorney, Agent, or Firm* — Leason Ellis LLP

(57) ABSTRACT

A harness connector is disclosed, which includes a shell and a wiring assembly. The shell includes an upper shell body and a lower shell body. The wiring assembly includes an insulating plate, a first copper bar and a second copper bar, the first copper bar is connected with a plurality of first cables, the second copper bar is connected with a plurality of second cables, the first cables and the second cables are located on the same side of the shell, the first copper bar and the second copper bar are respectively connected with a contact member, and the contact member is configured for being connected with an external terminal.

9 Claims, 4 Drawing Sheets

HARNESS CONNECTOR

CROSS-REFERENCE TO RELATED APPLICATION

This application is based on and claims the benefit of priority from Chinese Patent Application No. 2023218076442, filed on 10 Jul. 2023, the entirety of which is incorporated by reference herein.

TECHNICAL FIELD

The present disclosure relates to the technical field of connectors, and particularly to a harness connector.

BACKGROUND

Existing harness connectors often require large-volume, large-diameter cables to ensure high-current and high-power transmission. However, these large-volume cables may easily lead to the harness connector occupying too much mounting space and result in a large bending radius for the cables. When the cables are mounted in a confined space, forcibly bending thick cable cores can increase internal stress, not only making the mounting of the harness connector more difficult and squeezing other components, but also easily posing potential safety risks.

SUMMARY

The present disclosure aims to solve at least one of the technical problems in the prior art. Therefore, the present disclosure provides a harness connector, which is simple to assemble and high in use safety.

A harness connector according to an embodiment of the present disclosure comprises a shell and a wiring assembly, the shell comprises an upper shell body and a lower shell body, wherein the upper shell body and the lower shell body are detachably connected. The wiring assembly comprises an insulating plate, a first copper bar and a second copper bar, wherein the first copper bar, the insulating plate and the second copper bar are sequentially mounted between the upper shell body and the lower shell body in a vertical direction, the first copper bar is connected with a plurality of first cables, the plurality of first cables are arranged at intervals in a width direction of the first copper bar, the second copper bar is connected with a plurality of second cables, the plurality of second cables are arranged at intervals in a width direction of the second copper bar, the first cables and the second cables are located on the same side of the shell, the first copper bar and the second copper bar are respectively connected with a contact member, and the contact member is configured for being connected with an external terminal.

The harness connector according to the embodiment of the present disclosure at least has the following beneficial effects. Since a bending radius of a single cable core is consistent in different directions, replacement of the existing large-volume and large-diameter positive electrode and negative electrode cables with the plurality of thin first cables and the plurality of thin second cables i.e., replacement of a large-square cable with small-square cables laid flat, can reduce a height occupied by the harness connector, and can reduce a bending radius of the cable required in a vertical direction at the same time. The flexibility of the cables is improved while ensuring that the harness connector can normally perform large-current and high-power transmission, so that the harness connector can be mounted in a confined space, which improves the mounting convenience of the harness connector and expands the application scope of the harness connector. Moreover, excessive internal stress in the cables can be prevented so as not to squeeze other components, thus improving the use safety of the harness connector.

According to some embodiments of the present disclosure, each of the first cables is provided with a first connecting portion, the first connecting portion is fixed with the first copper bar by ultrasonic welding, each of the second cables is provided with a second connecting portion, and the second connecting portion is fixed with the second copper bar by ultrasonic welding.

According to some embodiments of the present disclosure, the first connecting portion and the second connecting portion are respectively located on two sides of the first copper bar and the second copper bar facing each other.

According to some embodiments of the present disclosure, a first accommodating cavity is formed between the insulating plate and the upper shell body, one end of the first cable close to the first connecting portion is accommodated in the first accommodating cavity, a second accommodating cavity is formed between the insulating plate and the lower shell body, and one end of the second cable close to the second connecting portion is accommodated in the second accommodating cavity.

According to some embodiments of the present disclosure, the insulating plate is provided with a supporting portion, and two ends of the supporting portion are respectively abutted with the first copper bar and the second copper bar.

According to some embodiments of the present disclosure, one side of the lower shell body facing away from the upper shell body is provided with a hollow column with an opened end portion, the contact member corresponds to the hollow column one by one and is mounted in the hollow column, a pressing member is arranged between the contact member and the upper shell body, and the pressing member is configured for limiting the contact member in a radial direction of the hollow column.

According to some embodiments of the present disclosure, the first copper bar and the second copper bar are respectively provided with a positioning table, the positioning table is provided with a through hole, the contact member cooperates with the through hole by inserting into the through hole, the pressing member is provided as a pressing cap, an inner end surface of the pressing cap is abutted with the contact member, and two ends of the pressing cap are respectively abutted with the upper shell body and the positioning table.

According to some embodiments of the present disclosure, the shell is provided with a limiting assembly, and the limiting assembly is connected with the insulating plate to limit the insulating plate in three directions of X-axis, Y-axis, and Z-axis.

According to some embodiments of the present disclosure, the shell is provided with a handle member, the handle member is movably connected with the shell, the shell is provided with an accommodating groove, and the handle member is movable to enable the handle member to enter or withdraw from the accommodating groove.

According to some embodiments of the present disclosure, two ends of the handle member are respectively hinged with two sides of the upper shell body, and a top end surface of the upper shell body is provided with the accommodating groove matched with a shape of the handle member.

The additional aspects and advantages of the present disclosure will be partially provided in the following description, and will partially be apparent in the following description, or learned by practice of the present disclosure.

BRIEF DESCRIPTION OF THE DRAWINGS

The present disclosure is further described hereinafter with reference to the drawings and embodiments, wherein.

Figure 1:
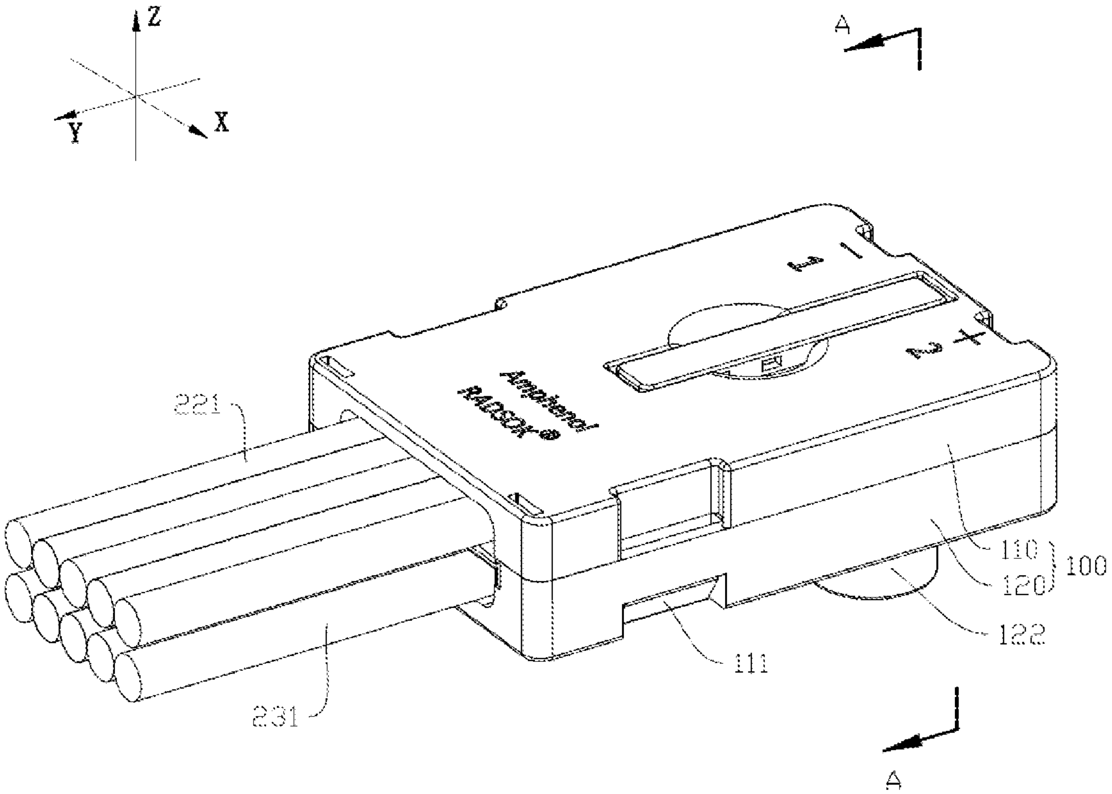
FIG. 1 is a schematic structural diagram of a harness connector according to an embodiment of the present disclosure.

Reference numerals: 100 refers to shell; 101 refers to first accommodating groove; 102 refers to sliding groove; 103 refers to second clamping groove; 104 refers to second accommodating groove; 110 refers to upper shell body; 111 refers to first buckle; 112 refers to first accommodating cavity; 120 refers to lower shell body; 1201 refers to first clamping groove; 121 refers to second accommodating cavity; 122 refers to hollow column; 123 refers to partition plate; 130 refers to pressing member; 131 refers to washer; 140 refers to limiting assembly; 1401 refers to first limiting groove; 1402 refers to second limiting groove; 141 refers to limiting rib; 142 refers to limiting block; 143 refers to limiting table; 150 refers to handle member; 160 refers to second buckle; 200 refers to wiring assembly; 201 refers to through hole; 210 refers to insulating plate; 211 refers to supporting portion; 212 refers to first bump; 213 refers to second bump; 214 refers to third bump; 220 refers to first copper bar; 221 refers to first cable; 222 refers to first connecting portion; 223 refers to first transition section; 224 refers to first mounting plate; 225 refers to first positioning table; 230 refers to second copper bar; 231 refers to second cable; 232 refers to second connecting portion; 233 refers to second transition section; 234 refers to second mounting plate; 235 refers to second positioning table; and 240 refers to contact member.

DETAILED DESCRIPTION

Embodiments of the present disclosure are described in detail hereinafter, and examples of the embodiments are shown in the drawings, wherein the same or similar reference numerals throughout the drawings denote the same or similar elements or elements having the same or similar functions. The embodiments described hereinafter with reference to the drawings are exemplary, and are only used to explain the present disclosure, but should not be understood as limiting the present disclosure.

In the description of the present disclosure, it should be understood that the orientations or positional relationships indicated by the terms such as “upper”, “lower”, “front”, “rear”, “left”, “right” and the like, refer to the orientations or positional relationships shown in the drawings, which are only intended to facilitate describing the present disclosure and simplifying the description, and do not indicate or imply that the indicated devices or elements must have a specific orientation, be constructed and operated in a specific orientation, and therefore cannot be understood as a limitation of the present disclosure.

In the description of the present disclosure, “several” refers to being one or more, “multiple” refers to being two or more, and “greater than”, “less than”, “more than”, and the like are understood as not including the following number, while “above”, “below”, “within”, and the like are understood as including the following number. If there is a description of first and second, it is only for the purpose of distinguishing technical features, and should not be understood as indicating or implying relative importance, implicitly indicating the number of the indicated technical features or implicitly indicating the order of the indicated technical features.

In the description of the present disclosure, the terms “arrangement”, “mounting”, “connection”, and the like should be understood in a broad sense unless otherwise specified and defined. The specific meaning of the above terms in the present disclosure may be reasonably determined according to specific contents of the technical solutions by those of ordinary skills in the art.

Figure 2:
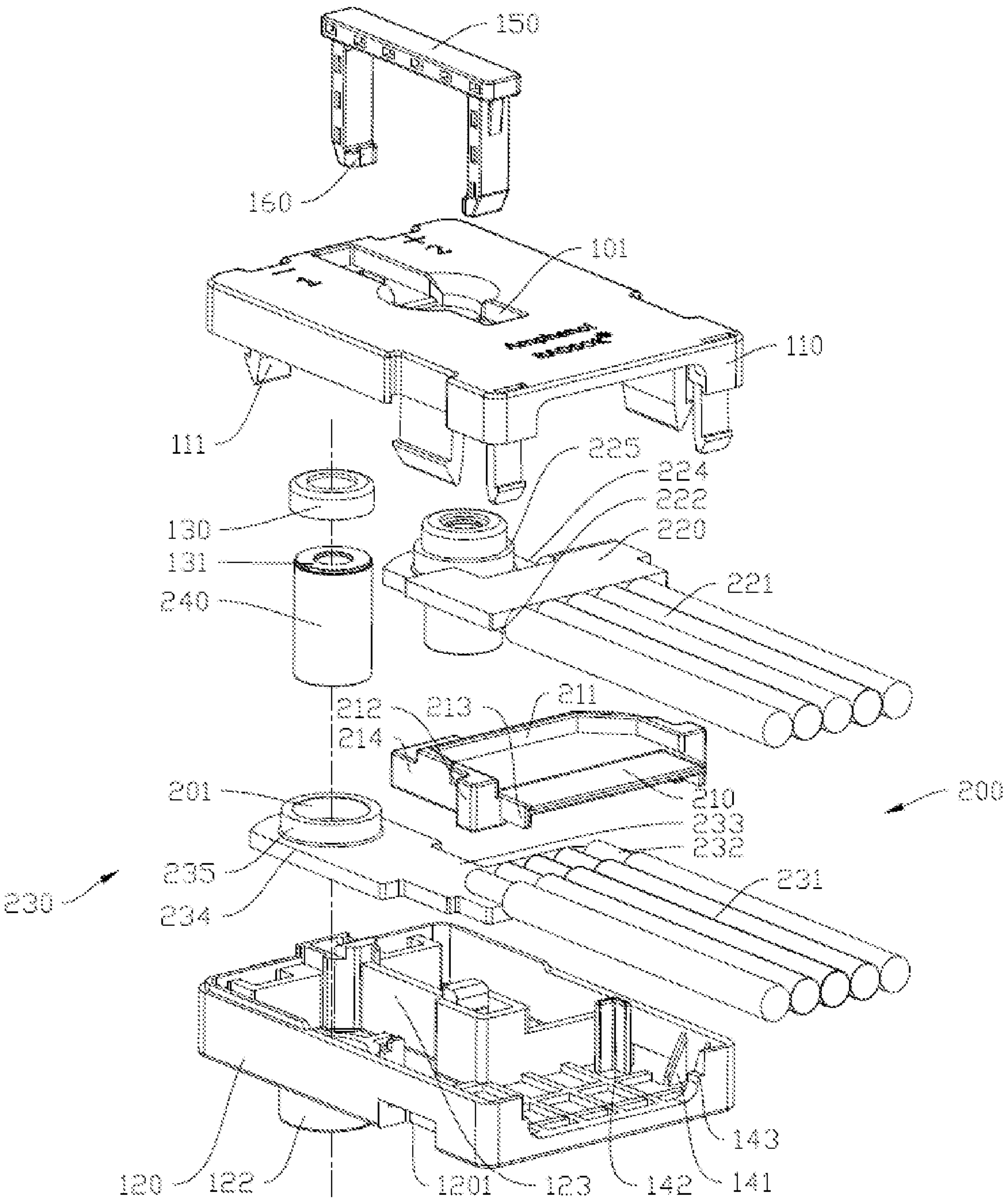
FIG. 2 is an exploded view of the harness connector according to an embodiment of the present disclosure.

With reference to FIG. 1 and FIG. 2, a harness connector according to an embodiment of the present disclosure comprises a shell 100 and a wiring assembly 200. The shell 100 comprises an upper shell body 110 and a lower shell body 120, wherein the upper shell body 110 and the lower shell body 120 are detachably connected. The wiring assembly 200 comprises an insulating plate 210, a first copper bar 220 and a second copper bar 230, wherein the first copper bar 220, the insulating plate 210 and the second copper bar 230 are sequentially mounted between the upper shell body 110 and the lower shell body 120 in a vertical direction (in this embodiment, the vertical direction is Z-axis direction, which is namely the height direction of the harness connector, and the length direction of the harness connector is Y-axis direction, and the width direction of the harness connector is X-axis direction, which are specifically described herein and will not be repeated hereafter). The first copper bar 220 is connected with a plurality of first cables 221, the plurality of first cables 221 are arranged at intervals in a width direction of the first copper bar 220, and an outer diameter of each of the first cables 221 is generally less than or equal to 20% of a width of the first copper bar 220. The second copper bar 230 is connected with a plurality of second cables 231, the plurality of second cables 231 are arranged at intervals in a width direction of the second copper bar 230, and an outer diameter of each of the second cables 231 is the same as that of the first cable 221. The first cable 221 and the second cable 231 are located on the same side of the shell 100, one of the first cable 221 and the second cable 231 is a positive electrode cable, and the other is a negative electrode cable. Because the first copper bar 220 is located above, the first copper bar 220 is connected with a first mounting plate 224 through a downwardly inclined first transition section 223, the first copper bar 220, the first transition section 223 and the first mounting plate 224 are integrally formed, and the first mounting plate 224 is connected with a contact member 240. The second copper bar 230 is connected with a second mounting plate 234 through a straight second transition section 233, the second copper bar 230, the second transition section 233 and the second mounting plate 234 are integrally formed, and the second mounting plate 234 is also connected with a contact member 240. The first mounting plate 224 and the second mounting plate 234 are separated from each other through a partition plate 123 on the lower shell body 120, and two contact members 240 are both configured for being connected with an external terminal.

It is understandable that circular cable lugs are directly used to convert two thick cables into terminals in a traditional harness connector, which may ensure high-current and high-power transmission, but the thick cables have a large bending radius and a high mounting height, thus being not suitable for use in a confined space. The plurality of thin first cables 221 and the plurality of thin second cables 231 are used to replace existing large-volume and large-diameter positive electrode and negative electrode cables. Since a bending radius of a single cable core is consistent in different directions, replacement of a large-square cable with small-square cables laid flat can reduce a height occupied by the harness connector and can reduce a bending radius of the cable required in a vertical direction at the same time. Moreover, the first cable 221 and the second cable 231 are arranged on the same side of the shell 100, so that not only a length of the harness connector can be effectively reduced, but also a height of the harness connector can be further reduced due to that the first cables 221 and the second cables 231 are laid flat compared with a traditional way in which the thick cables are placed side by side. The flexibility of the cables is improved while ensuring that the harness connector can normally perform large-current and high-power transmission, so that the harness connector can be mounted in a confined space, thereby improving the mounting convenience of the harness connector, and expanding an application scope of the harness connector. Moreover, internal stress in the plurality of thin cables after bending are evenly distributed, which prevents excessive internal stress in the cables from squeezing other components, thus improving the use safety of the harness connector.

Further, the upper shell body 110 is provided with a plurality of first buckles 111, the plurality of first buckles 111 are arranged at intervals in a circumferential direction of the upper shell body 110, the lower shell body 120 is provided with first clamping grooves 1201 corresponding to the first buckles 111 one by one, and the first buckles 111 are clamped and matched with the first clamping grooves 1201. By directly fastening the first buckles 111, users can complete the assembly of the shell 100. By pulling out the first buckles 111, users can disassemble the shell 100. By the arrangement of the first buckles 111 and the first clamping grooves 1201, the shell 100 can be structurally simplified, which is convenient for the user to assemble and disassemble, and effectively improves the assembly efficiency of the connector while ensuring the connection stability between the upper shell body 110 and the lower shell body 120.

With reference to FIG. 2, it is understandable that each of the first cables 221 is provided with a first connecting portion 222, the first connecting portion 222 is a conductive cable core portion of the first cable 221, and the first connecting portion 222 and the first copper bar 220 are fixed by ultrasonic welding. Each of the second cables 231 is provided with a second connecting portion 232, the second connecting portion 232 is a conductive cable core portion of the second cable 231, and the second connecting portion 232 and the second copper bar 230 are fixed by ultrasonic welding. The traditional harness connector usually has the thick cable fixedly crimped with the circular cable lug, which is easily influenced by raw materials and equipment, resulting in unstable impedance and a higher likelihood of producing defective products. In contrast, using ultrasonic welding to secure the first cable 221 and the second cable 231 results in atomic-level crystal phase recombination between the cable and the corresponding copper bar. This renders the connection impedance nearly negligible, thus effectively enhancing a current-carrying capacity of the harness connector, and improving the working efficiency of the harness connector.

Figure 3:
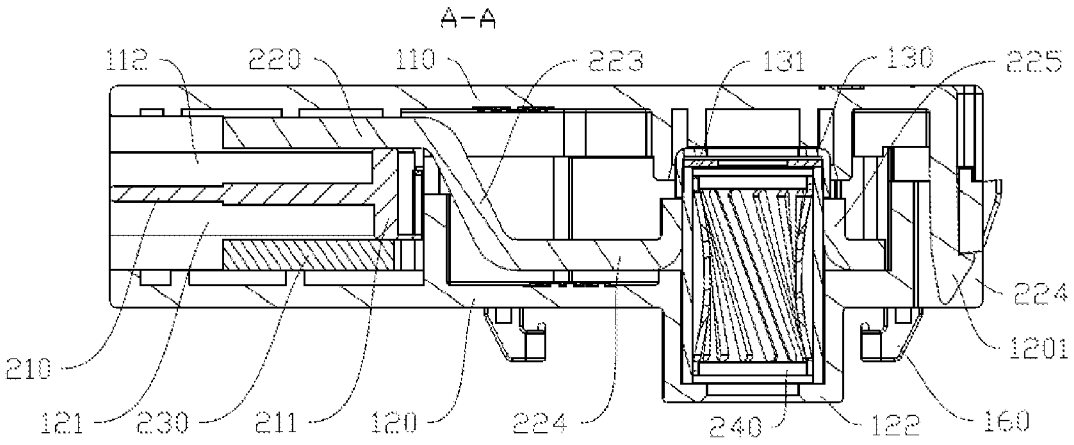
FIG. 3 is a sectional view of part A in FIG. 1.

With reference to FIG. 2 and FIG. 3, it is understandable that the first connecting portion 222 and the second connecting portion 232 are respectively located on opposite sides of the first copper bar 220 and the second copper bar 230. The first connecting portion 222 and the second connecting portion 232 are arranged oppositely, and the first connecting portion 222 and the second connecting portion 232 will not interfere with each other due to the existence of the insulating plate 210. This arrangement can avoid the upper shell body 110 from pressing and wearing the first connecting portion 222, or avoid the lower shell body 120 from pressing and wearing the second connecting portion 232, so that an inner end surface of the upper shell body 110 may be attached to a top end surface of the first copper bar 220, and an inner end surface of the lower shell body 120 may be attached to a bottom end surface of the second copper bar, thus effectively improving an assembly degree of the connector.

With reference to FIG. 3, it is understandable that, in a length direction of the shell, the insulating plate 210 is longer than the first copper bar 220 and the second copper bar 230, and a part of the insulating plate 210 beyond the first copper bar 220 and the second copper bar 230 forms a first accommodating cavity 112 with the upper shell body 110 and forms a second accommodating cavity 121 with the lower shell body 120. One end of the first cable 221 close to the first connecting portion 222 is accommodated in the first accommodating cavity 112, and one end of the second cable 231 close to the second connecting portion 232 is accommodated in the second accommodating cavity 121. By this arrangement, after the first connecting portion 222 of the first cable 221 and the second connecting portion 232 of the second cable 231 are connected respectively with the corresponding copper bars, there are still certain parts of the cables accommodated in the shell 100, so that when the user bends the first cable 221 and the second cable 231, there is a certain distance between a bent part of the first cable 221 and the first connection portion 222, and an internal bending stress of the first cable 221 will not completely act on the first connection portion 222; and there is a certain distance between a bent part of the second cable 231 and the second connecting portion 232, and an internal bending stress of the second cable 231 will not completely act on the second connecting portion 232, thus reducing tensile forces on the first connecting portion 222 and the second connecting portion 232 when the first cable 221 and the second cable 231 are bent, and effectively improving the connection stability between the first cable 221 and the second cable 231. In addition, by the arrangement of the first accommodating cavity 112 and the second accommodating cavity 121, the first connecting portion 222 and the second connecting portion 232 may also be concealed and accommodated, thus improving the aesthetic appearance of the connector.

Further, the insulating plate 210 is provided with a supporting portion 211, the supporting portion 211 is arranged on upper and lower sides of the insulating plate 210 in a circumferential direction of the insulating plate 210, and avoids protruding structures of the first cable 221 and the second cable 231, and two ends of the supporting portion 211 are respectively abutted with the first copper bar 220 and the second copper bar 230. When the first connecting portion

222 and the second connecting portion 232 are respectively located on two sides of the first copper bar 220 and the second copper bar 230 facing each other, two sides of the upper shell body 110 and the lower shell body 120 facing each other are respectively attached to two sides of the first copper bar 220 and the second copper bar 230 facing away from each other. By the arrangement of the supporting portion 211, the supporting portion 211 is matched with the upper shell body 110, so that the first copper bar 220 may be clamped tightly, and the supporting portion 211 is matched with the lower shell body 120, so that the second copper bar may be clamped tightly. This arrangement can effectively improve the mounting stability of the first copper bar 220 and the second copper bar 230 and improve the structural compactness of the connector.

Figure 4:
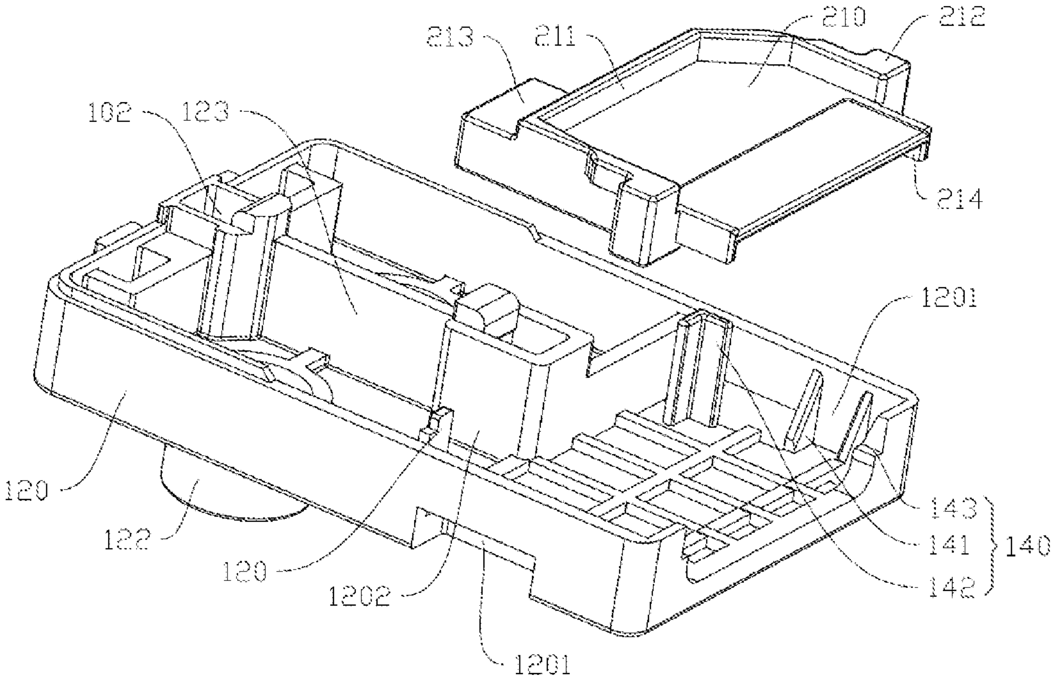
FIG. 4 is a schematic diagram of connection between an insulating plate and a lower shell body according to an embodiment of the present disclosure.

With reference to FIG. 3 and FIG. 4, it is understandable that one side of the lower shell body 120 facing away from the upper shell body 110 is provided with a hollow column 122 with an opened end portion, i.e., a center line of the hollow column 122 is perpendicular to a center line of the first cable 221 (or the second cable 231), so as to reduce a length of the connector and improve a space utilization rate of the connector. The contact member 240 corresponds to the hollow column 122 one by one and is mounted in the hollow column 122, a pressing member 130 is arranged between the contact member 240 and the upper shell body 110, and the pressing member 130 is configured for limiting the contact member 240 in a radial direction of the hollow column 122. An inner side wall of the hollow column 122 may limit the contact member 240 in a circumferential direction of the contact member 240, the pressing member 130 may limit the contact member 240 along a radial direction of the hollow column 122, i.e., along a radial direction of the contact member 240. Cooperation of the hollow column 122 with the pressing member 130 can limit the contact member 240 in all aspects, thus effectively improving the mounting stability of the contact member 240, avoiding problems such as shaking, deviation or inclination of the contact member 240 in use, and further improving the use safety of the connector. In addition, the hollow column 122 conceals and accommodates the contact member 240, which avoids the contact member 240 from making direct contact with an external environment, thus further improving the aesthetic appearance of the connector, and prolonging a service life of the contact member 240.

It should be added that the contact member 240 may be provided as a male terminal, a main body of the male terminal is mounted inside the hollow column 122, and a plug passes through an opening of the hollow column 122 to mate with an external female terminal. The contact member 240 may also be provided as a female terminal, a main body of the female terminal is mounted inside the hollow column 122, a jack is coaxial with the opening of the hollow column 122, and an external male terminal plug passes through the opening of the hollow column 122 to mate with the jack of the female terminal. The structure of the contact member 240 is not specifically limited herein, and the user may choose an appropriate type of the contact member 240 according to actual needs, as long as the connector can be ensured to transmit a current stably.

Further, a first connecting plate of the first copper bar 220 is provided with a first positioning table 225, and a second connecting plate of the second copper bar 230 is provided with a second positioning table 235. The first positioning table 225 and the second positioning table 235 are both provided with a through hole 201, and the contact member 240 corresponds to the through hole 201 one by one and cooperates with the through hole by inserting into the through hole. The pressing member 130 is provided as a pressing cap, a washer 131 is arranged in the pressing cap, the pressing cap is arranged around the contact member 240, and the washer 131 is abutted with the contact member 240. Two ends of the pressing cap are respectively abutted with the upper shell body 110 and the positioning table. By the arrangement of the pressing cap, the pressing cap may also press the corresponding positioning table while pressing the contact member 240, so that the first connecting plate and the second connecting plate are respectively attached to the inner end surface of the lower shell body 120, thus further improving the mounting stability of the first copper bar 220 and the second copper bar 230 and the mounting stability of the contact member 240.

With reference to FIG. 4, it is understandable that the shell 100 is provided with a limiting assembly 140, the limiting assembly 140 is connected with the insulating plate 210 to limit the insulating plate 210 in three directions of X-axis, Y-axis and Z-axis. Specifically, the limiting assembly 140 comprises a limiting rib 141, a limiting block 142 and a limiting table 143. Four limiting ribs 141 are provided, and the four limiting ribs 141 are symmetrically arranged on two sides of the insulating plate 210 in the length direction (which is namely the Y-axis direction) of the connector. A first limiting groove 1401 is formed between two limiting ribs 141 on the same side of the insulating plate 210, two sides of the insulating plate 210 are respectively provided with a first bump 212, and the first bumps 212 correspond to the first limiting grooves 1401 one by one and cooperates respectively with the first limiting grooves by clamping, so that the insulating plate 210 is limited in the Y-axis direction. Two limiting blocks 142 are provided, one limiting block 142 is arranged at an interval with the partition plate 123 in the width direction (which is namely the X-axis direction) of the connector and forms a second limiting groove 1402 with the partition plate 123, and the other limiting block 142 is L-shaped. One end of the insulating plate 210 close to the partition plate 123 is provided with a second bump 213, the second bump 213 cooperates with the second limiting groove 1402 by clamping, and an edge of the insulating plate 210 is abutted with the L-shaped limiting block 142, so that the insulating plate 210 is limited in the X-axis direction. The limiting table 143 is located at one end of the shell 100 close to the first cable 221 and two limiting tables are provided, the two limiting tables 143 are symmetrically arranged on one of the upper shell body 110 and the lower shell body 120, and form a third accommodating groove (not shown in the figures) with the other one of the upper shell body 110 and the lower shell body 120, an end portion of the insulating plate 210 is provided with a third bump 214 matched with a shape of a third limiting groove, and the third bump 214 is accommodated in the third limiting groove, thus limiting the insulating plate 210 in the Z-axis direction. By the arrangement of the limiting assembly 140, the insulating plate 210 may be limited in the X-axis, Y-axis and Z-axis directions, which effectively improves the mounting stability, and avoids the first cable 221 and/or the second cable 231 from driving the insulating plate 210 to move when the user bends the first cable 221 and/or the second cable 231, thus ensuring that the positioning of the insulating plate 210 remains affected when the cables are bent, thereby effectively improving the working stability of the connector.

Figure 5:
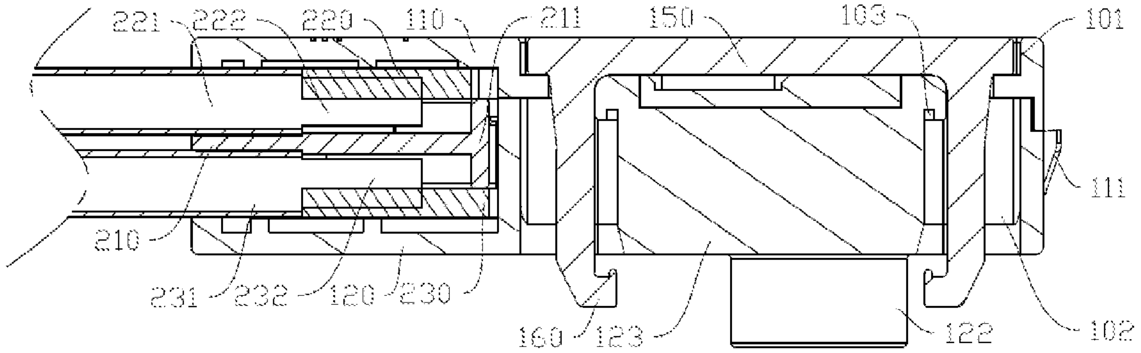
FIG. 5 is a sectional view of a harness connector according to First Embodiment of the present disclosure.
Figure 6:
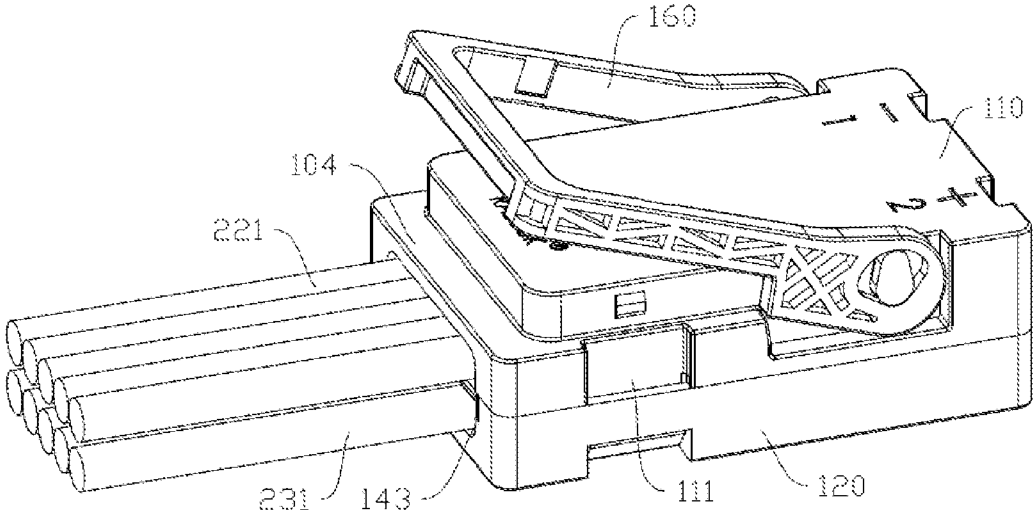
FIG. 6 is a schematic structural diagram of a harness connector according to Second Embodiment of the present disclosure.

With reference to FIG. 5 and FIG. 6, it is understandable that the shell 100 is provided with a handle member 150, the handle member 150 is movably connected with the shell 100, the shell 100 is provided with an accommodating groove, and the handle member 150 is movable to enable the handle member 150 to enter or withdraw from the accommodating groove. When the handle member 150 is put into the accommodating groove, an overall height of the connector is reduced, which ensures that the connector may be normally mounted in a confined place. When the handle member 150 is moved out of the accommodating groove, the user may move the whole connector by pulling up the handle member, thus effectively improving the practicability of the connector and improving the use experience of the user.

With reference to FIG. 2, FIG. 4 and FIG. 5, it is noted that the handle member 150 may be provided as a vertical pull-up handle. In this case, two ends of the handle member 150 are respectively provided with a second buckle 160. The shell 100 is provided with a first accommodating groove 101, a sliding groove 102 communicated with the first accommodating groove 101 and a second clamping groove 103 communicated with the sliding groove 102, the first accommodating groove 101 is configured for accommodating the handle member 150, the handle member 150 is slidably mounted in the sliding groove 102, and the second clamping groove 103 cooperates with the second buckle 160 by insertion. By this arrangement, an exposed structure of the handle member 150 may be greatly concealed during accommodation while ensuring the normal use of the handle member 150, thus further improving the aesthetic appearance of the connector.

With reference to FIG. 6, it is understandable that the handle member 150 may also be provided as an overturn pull-up handle. In this case, two ends of the handle member 150 are respectively hinged with two sides of the upper shell body 110. A top end surface of the upper shell body 110 is provided with a second accommodating groove 104 matched with a shape of the handle member 150. This arrangement can further simplify the structure of the connector and improve the assembly efficiency of the connector.

The embodiments of the present disclosure are described in detail with reference to the drawings above, but the present disclosure is not limited to the above embodiments, and various changes may also be made within the knowledge scope of those of ordinary skills in the art without departing from the purpose of the present disclosure.

What is claimed is:

1. A harness connector, comprising:

a shell comprising an upper shell body and a lower shell body, wherein the upper shell body and the lower shell body are detachably connected; and a wiring assembly comprising an insulating plate, a first copper bar and a second copper bar, wherein the first copper bar, the insulating plate and the second copper bar are sequentially mounted between the upper shell body and the lower shell body in a vertical direction, the first copper bar is connected with a plurality of first cables, the plurality of first cables are arranged at intervals in a width direction of the first copper bar, the second copper bar is connected with a plurality of second cables, the plurality of second cables are arranged at intervals in a width direction of the second copper bar, the first cables and the second cables are located on the same side of the shell, the first copper bar and the second copper bar are respectively connected with a contact member, and the contact member is configured for being connected with an external terminal;

wherein one side of the lower shell body facing away from the upper shell body is provided with a hollow column with an opened end portion, the contact member corresponds to the hollow column one by one and is mounted in the hollow column, a pressing member is arranged between the contact member and the upper shell body, and the pressing member is configured for limiting the contact member in a radial direction of the hollow column.

2. The harness connector according to claim 1, wherein each of the first cables is provided with a first connecting portion, the first connecting portion is fixed with the first copper bar by ultrasonic welding, each of the second cables is provided with a second connecting portion, and the second connecting portion is fixed with the second copper bar by ultrasonic welding.

3. The harness connector according to claim 2, wherein the first connecting portion and the second connecting portion are respectively located on two sides of the first copper bar and the second copper bar facing each other.

4. The harness connector according to claim 2, wherein a first accommodating cavity is formed between the insulating plate and the upper shell body, one end of the first cable close to the first connecting portion is accommodated in the first accommodating cavity, a second accommodating cavity is formed between the insulating plate and the lower shell body, and one end of the second cable close to the second connecting portion is accommodated in the second accommodating cavity.

5. The harness connector according to claim 4, wherein the insulating plate is provided with a supporting portion, and two ends of the supporting portion are respectively abutted with the first copper bar and the second copper bar.

6. The harness connector according to claim 1, wherein the first copper bar and the second copper bar are respectively provided with a positioning table, the positioning table is provided with a through hole, the contact member cooperates with the through hole by inserting into the through hole, the pressing member is provided as a pressing cap, an inner end surface of the pressing cap is abutted with the contact member, and two ends of the pressing cap are respectively abutted with the upper shell body and the positioning table.

7. The harness connector according to claim 1, wherein the shell is provided with a limiting assembly, and the limiting assembly is connected with the insulating plate to limit the insulating plate in three directions of X-axis, Y-axis, and Z-axis.

8. The harness connector according to claim 1, wherein the shell is provided with a handle member, the handle member is movably connected with the shell, the shell is provided with an accommodating groove, and the handle member is movable to enable the handle member to enter or withdraw from the accommodating groove.

9. The harness connector according to claim 8, wherein two ends of the handle member are respectively hinged with two sides of the upper shell body, and a top end surface of the upper shell body is provided with the accommodating groove matched with a shape of the handle member.

* * * * *